United States Patent
Straw et al.

(10) Patent No.: US 11,301,009 B2
(45) Date of Patent: Apr. 12, 2022

(54) FAN CONTROL FOR COMPUTING DEVICES

(71) Applicant: SoftIron Limited, Chilworth (GB)

(72) Inventors: Phillip Edward Straw, Newark, CA (US); Robert Drury, Louth (GB); David Patrick Anders, Hurst, TX (US); Alan Ott, Oviedo, FL (US); Bryan Keith Larmore, Astatula, FL (US)

(73) Assignee: SOFTIRON LIMITED, London (GB)

( * ) Notice: Subject to any disclaimer, the term of this patent is extended or adjusted under 35 U.S.C. 154(b) by 0 days.

(21) Appl. No.: 16/431,680

(22) Filed: Jun. 4, 2019

(65) Prior Publication Data
US 2021/0089096 A1 Mar. 25, 2021

(51) Int. Cl.
*G06F 1/20* (2006.01)
*F04D 29/66* (2006.01)
*F04D 27/00* (2006.01)

(52) U.S. Cl.
CPC ........... *G06F 1/206* (2013.01); *F04D 27/004* (2013.01); *F04D 29/661* (2013.01); *G06F 2200/201* (2013.01)

(58) Field of Classification Search
CPC .... F04D 27/003; F04D 29/661; F04D 29/663; G06F 1/206; G06F 2200/201
See application file for complete search history.

(56) References Cited

U.S. PATENT DOCUMENTS

| | | | | |
|---|---|---|---|---|
| 2008/0095620 | A1* | 4/2008 | Osborn | F04D 29/663 416/1 |
| 2008/0131100 | A1* | 6/2008 | Chen | F04D 27/004 388/829 |
| 2009/0015241 | A1* | 1/2009 | Gross | G01P 3/48 324/166 |
| 2009/0067080 | A1* | 3/2009 | Gross | G11B 33/08 360/71 |
| 2009/0195922 | A1* | 8/2009 | Urmanov | G11B 25/043 360/97.19 |
| 2011/0051357 | A1* | 3/2011 | Orr | G06F 1/20 361/679.48 |
| 2012/0078420 | A1* | 3/2012 | Jensen | G06F 1/206 700/275 |
| 2013/0037620 | A1* | 2/2013 | Aryanfar | G06F 1/206 236/49.3 |

(Continued)

Primary Examiner — Patrick Hamo
(74) Attorney, Agent, or Firm — Slayden Grubert Beard PLLC

(57) ABSTRACT

A fan device used with respect to a computing device. The fan device includes at least two fans that provide airflow for the computing device and a controller that adjusts the fans' speeds in an attempt to avoid harmonic vibrations of the at least two fans. The fan device may include at least one sensor, and the controller may adjust the fans' speeds based at least on information from the sensor(s) in the attempt to avoid the harmonic vibrations. The attempt to avoid the harmonic vibrations may also attempt to mitigate one or more of turbulence, pressure, over-heating, power consumption, or noise in, by, or around the computing device. Reversal of airflow may also be used. A fan bar that enables isolation of ground return noise may also be used. The controller may use sums of primes calculations, phase analysis, common divisor calculations, and the like. Also, associated methods.

14 Claims, 3 Drawing Sheets

(56) References Cited

U.S. PATENT DOCUMENTS

| | | | | |
|---|---|---|---|---|
| 2013/0076286 A1* | 3/2013 | Patton | ............... | G10K 11/161 |
| | | | | 318/460 |
| 2017/0160771 A1* | 6/2017 | Albrecht | ............... | G06F 1/206 |
| 2018/0341300 A1* | 11/2018 | Han | ............... | G06F 1/206 |
| 2019/0086528 A1* | 3/2019 | Steiner | ............... | F04D 29/661 |
| 2019/0235982 A1* | 8/2019 | North | ............... | H05K 7/20209 |
| 2019/0239384 A1* | 8/2019 | North | ............... | G06F 1/3206 |
| 2020/0133358 A1* | 4/2020 | Mishra | ............... | H04B 1/3827 |
| 2020/0413573 A1* | 12/2020 | Kharisov | ............... | G06F 1/3221 |
| 2021/0180604 A1* | 6/2021 | Lin | ............... | F04D 27/004 |

* cited by examiner

FAN CONTROL FOR COMPUTING DEVICES

CROSS-REFERENCE TO RELATED APPLICATION

Not applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

The present disclosure generally relates to controlling fans used to mitigate one or more of turbulence, pressure, over-heating, power consumption, or noise in, by, or around a computing device.

SUMMARY

Aspects of the subject technology include a fan device used with respect to a computing device. The fan device includes at least two fans that provide airflow for the computing device, and a controller that adjusts the fans' speeds in an attempt to avoid harmonic vibrations of the at least two fans.

The fan device may also include at least one sensor. The controller may adjust the fans' speeds based at least on information from the at least one sensor in the attempt to avoid the harmonic vibrations. The attempt to avoid the harmonic vibrations may also attempt to mitigate one or more of turbulence, pressure, over-heating, power consumption, or noise in, by, or around the computing device.

In some aspects, the controller reverses airflow of at least one of the fans in an attempt to mitigate one or more of turbulence, pressure, over-heating, power consumption, or noise in, by, or around the computing device.

The fan device may include a fan bar that holds at least one of the fans. The fan bar may enable isolation of ground return noise by using local decoupling of the fans' power usage. The controller and the fans may communicate without use of cabling.

In some aspects, the controller may use mathematical calculations to control the fans. Examples of such calculations include but are not limited to one or more of sums of primes, for example related to one or more process variables for the fans, a constellation of the fans' speeds, phase shift transforms, and common divisor calculations. The controller preferably attempts to minimize the fans' speeds so as to prolong the fans' lives while making the effort to avoid the harmonic vibrations.

The subject technology also includes associated methods.

This brief summary has been provided so that the nature of the invention may be understood quickly. Additional steps and/or different steps than those set forth in this summary may be used. A more complete understanding of the invention may be obtained by reference to the following description in connection with the attached drawings.

DETAILED DESCRIPTION

Any physical object has frequencies at which they naturally vibrate. These frequencies are known as resonance frequencies. If a vibration is introduced into the object at one of its resonance frequencies, the results can be catastrophic. Two factors are necessary to create a failure: sufficient amplitude and the right frequency. One well known example is shattering of a crystal wine glass by a person signing loud enough (sufficient amplitude) at just the right pitch (frequency). Even if catastrophic failure does not occur, prolonged exposure of an object to vibrations at a sufficient amplitude and the right (or rather wrong) frequency or frequencies can damage the object.

Computing device(s) and portion(s) thereof are no exception—they also have resonance frequencies. Thus, prolonged exposure of computing device(s) and portion(s) thereof to vibrations at a sufficient amplitude and the right/wrong frequency or frequencies can cause damage.

One source of vibrations in many computing device(s), especially in large facilities such as data centers, is fans typically used for cooling and/or airflow. For example, a larger "server rack" or "rack unit" typically has many fans. If those fans are driven by a same power source, have an electrical connection such as power or ground connections, are of a same design, and/or are not properly controlled, the vibrations from the fans may tend to synch up.

This synching up can increase the amplitude of vibrations generated by the fans. If the frequency or frequencies of those vibrations match a resonant frequency of the computing device(s) or portion(s) thereof, damage can occur. However, fans controlled to have different harmonic vibrations are unlikely to synch up in this manner.

Cabling can also facilitate transmission of vibrations from the fan(s) to the computing device(s) or portion(s) thereof. Metal wire used in cabling can be an exceptionally effective transport vector for the vibrations.

Other issues regarding fans in computing device include but are not limited to turbulence, pressure, over-heating, power consumption, and/or noise in, by, or around the computing device(s). These issues may also be addressed by proper control.

Aspects of the subject technology are intended to address all or at least some of the foregoing issues.

Figure 1:
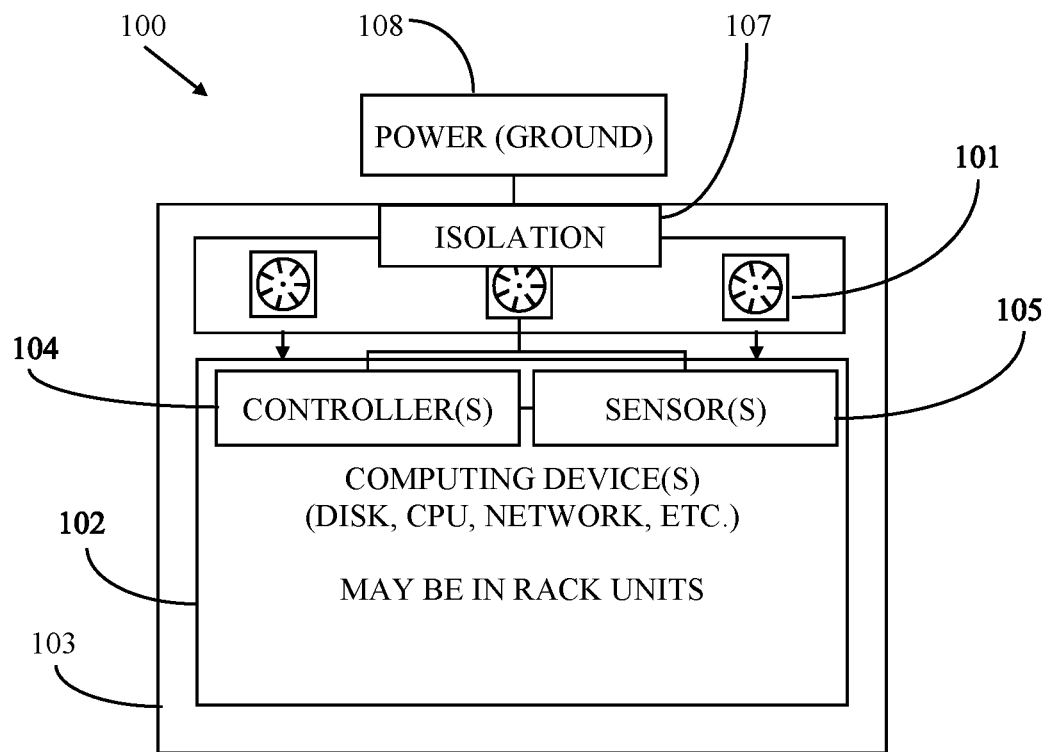
FIG. 1 illustrates a fan device arrangement including a controller and a fan bar according to aspects of the subject technology.

FIG. 1 illustrates fan device arrangement 100 including a controller and a fan bar according to aspects of the subject technology. Other elements may be included as well, and some illustrated elements may be omitted.

Fan arrangement 100 includes at least fans 101 for cooling and/or providing airflow for computing device(s) 102. Fans 101 preferably are variable speed fans.

While three fans are shown, any number of fans may be used. In some aspects, the fans create an "airflow lens" directed toward particular part(s) of computing device(s)

102, for example to cool one or more elements such as storage media or processor(s) that may have higher heat generation, power consumption, or the like.

Computing device(s) 102 are shown as part of rack unit (RU), data center, server, or other larger computing infrastructure 103. However, computing device(s) 102 may be a single stand-alone device or plural computing devices situated in another environment.

Controller(s) 104 adjusts the fans' speeds in an attempt to avoid harmonic vibrations of fans 101. As shown in FIG. 1, controller(s) 104 are a part of one or more computing device(s) 102. The computing device(s) may also include sensor(s) 105 that provide information to controller(s) 104. The controller(s) may adjust the fans' speeds based at least on information from the sensor(s) in the attempt to avoid the harmonic vibrations.

Controller(s) 104 may also attempt to control fans 101 in an attempt to mitigate one or more of turbulence, pressure, over-heating, power consumption, or noise in, by, or around the computing device. This control may be based on information from sensor(s) 105.

In some aspects, one or more fans 101 are held in or supported by one or more fan bar(s) 106. Fan bar(s) 106 preferably provided isolation 107 from power (ground) 108 that supplies power to fans 101 and/or computing device(s) 102. This isolation may include local decoupling of the fans' power usage from the each of the fans, the computing device, and/or portions thereof.

Noise or other signals in power (ground) 108 may communicate vibrations or create harmonics between fan(s) 101, for example via feedback and/or from an outside source. These vibrations and/or harmonics can cause damage as discussed above. Isolation 107 may mitigate the potential for such vibrations and/or harmonics to cause damage.

Isolation 107 may also mitigate the impact of power spikes resulting from a fan's starts or stops on other fan(s). Repeated power spikes can cause damage to fans. Thus, isolation 107 may help to prolong fan life.

Cabling can result in transmission of vibrations and/or harmonics. Namely, cabling including metallic conductors used to transmit power and/or information are also usually very good at transmitting vibration and harmonics. Preferred aspects of the subject technology therefore include supply of power and/or information (e.g., speed control) to the fans without use of cabling. For example, communications and/or transmission of power between computing device(s) 102, controller(s) 104, and/or fans 101 may be implemented via connections not involving cabling. For example, direct contact points such as metal pads that engage extended metal spikes may be used in the transmission of power and/or information.

Figure 2:
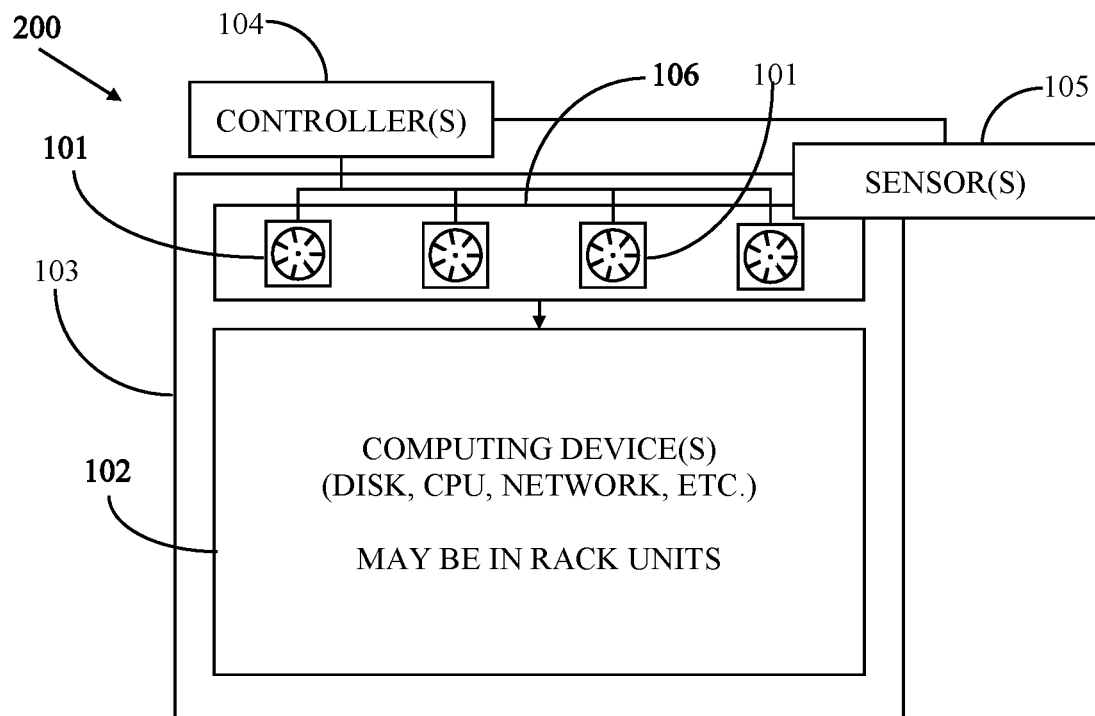
FIG. 2 illustrates another fan device arrangement including a controller and a fan bar according to aspects of the subject technology.

FIG. 2 illustrates another fan device arrangement 200 including a controller and a fan bar according to aspects of the subject technology. Controller(s) 104 need not be part of computing device(s) 102, fan bar 106, and/or rack unit (RU), data center, server, or other larger computing infrastructure 103. However, controller(s) 104 preferably can control operation of at least some of fans 101. Likewise, while sensor(s) 105 preferably are able to sense information about operation of at least some of fans 101 as illustrated by their proximity to the fan bar in FIG. 2, the sensor(s) need not be part of computing device(s) 102, fan bar 106, and/or rack unit (RU), data center, server, or other larger computing infrastructure 103.

Figure 3:
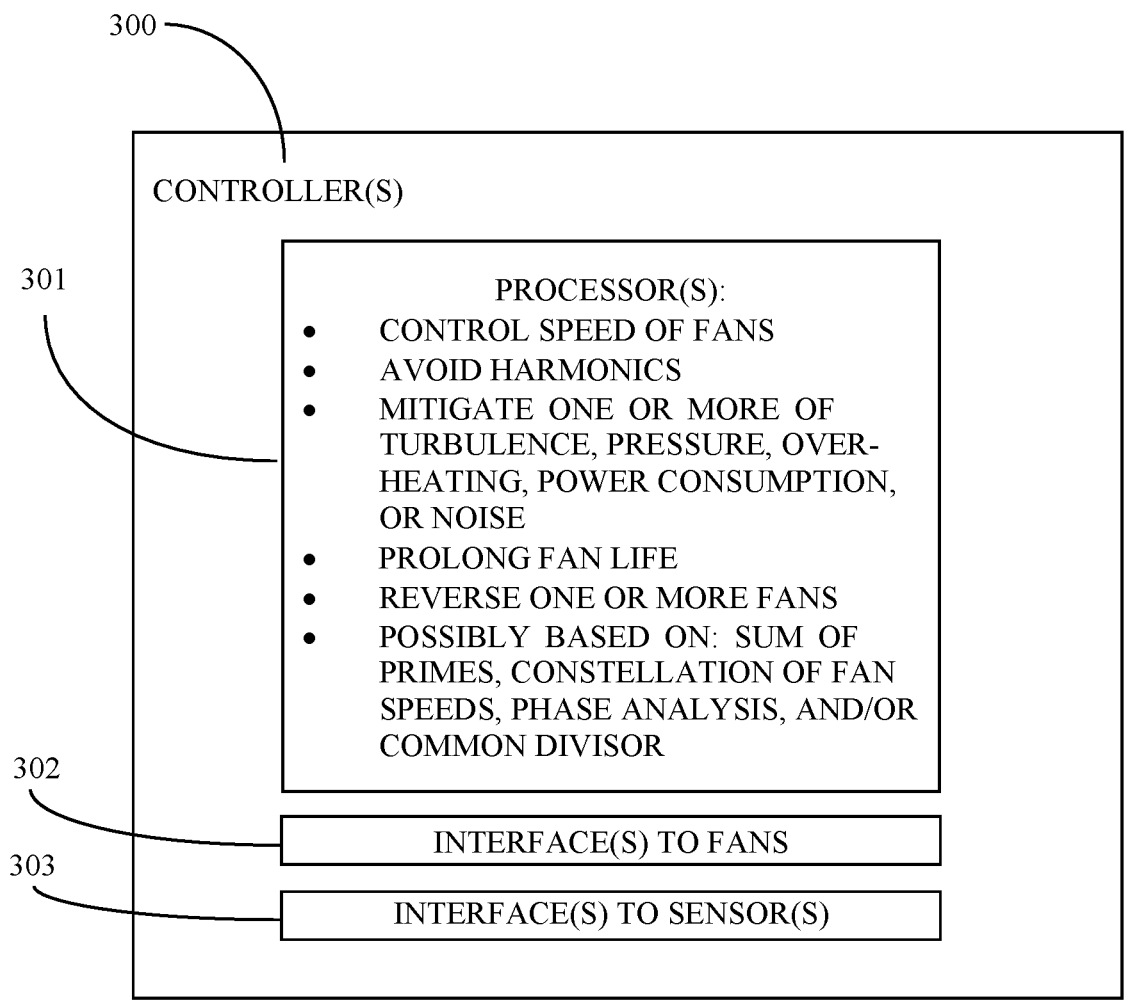
FIG. 3 illustrates controller(s) for fans according to aspects of the subject technology.

FIG. 3 illustrates controller(s) 300 for fans according to aspects of the subject technology. The controller(s) may serves as controller(s) 104 shown in FIGS. 1 and 2. Controller(s) 300 may be a single controller or plural controllers, situated locally, remotely, or both with respect to the fans, part of larger controller(s), or any other form of controller(s) for some or all of the operations of the fans. Some or all of the elements and/or features of controller(s) 300 shown in FIG. 3 may be included. Other elements and/or feature(s) may be included, and some illustrated elements may be omitted.

Controller(s) 300 in FIG. 3 includes processor(s) 301, interface(s) 302 to fans such as fans 101, and interface(s) 303 to sensor(s) such as sensor(s) 105. Controller(s) 300 preferably use processor(s) 301 in an attempt to achieve some or all of the following goals: avoid harmonic vibrations, mitigate one or more of turbulence, pressure, over-heating, power consumption, or noise, prolong fan life, and/or other goals.

Control of the fans may include adjusting fan speeds (e.g., RPM—rounds per minute) including possibly to zero RPM (i.e., stopped) and/or reversing one or more of the fans. Slower speeds may result in less power consumption by and/or wear of the fans. Reversing fans may facilitate cooling functions.

The control may be based on information from sensor(s) as well as certain mathematical and/or processing activities. These activities preferably include but are not limited to one or more of sums of primes calculations, processing a constellation of fan operation information, phase analysis, and/or common divisor calculations. Each of these is explained in more detail below.

Sums of Primes Calculations

Control may involve sums of primes calculations to control the fans' speeds. A code/pseudo-code fragment cast in the Python computing language for an example of a sum of primes calculation follows:

```
#!/usr/bin/python
import random
#minimum PWM setting 25% on fan
def get_primes(n):
    numbers = set(range(n, 1, -1))
    primes = [ ]
    while numbers:
        p = numbers.pop( )
        primes.append(p)
        numbers.difference_update(set(range(p*2, n+1, p)))
    primes=sorted(primes)
    return primes
def get_fanplan(numbers, target, partial=[ ]):
    s = sum(partial)
    # check if the partial sum is equals to target
    if s == target:
    shufflepartial = random.shuffle(partial)
    if s >= target:
        return # if we reach the number, stop
    for i in range(len(numbers)):
        n = numbers[i]
        remaining = numbers[i+1:]
        get_fanplan(remaining, target, partial + [n])
    # n is the total fan flow
    # def get_temperatures( ):
    # def get_PI_total( ):
    # all the primes in 8 bits
    primes = get_primes(255)
    # create a process variable total that will later come from
    # temperature input into a PI control algorithm that will output a total
    # created total here is between 100 and 300 RPM for all the fans
    attempt = random.randrange(100 , 300)
    get_fanplan(primes, attempt)
```

The subject technology is not limited to this sample code/pseudo-code fragment and the comments therein. Also, other computing languages may be used.

In preferred aspects, the sums of primes are related to one or more process variables for the fans. Temperature is the process variable in the above code/pseudo-code fragment (def get_temperatures( )). Other process variables may be used alone or in combination. Temperature may be included or excluded from the process variables.

Examples of process variables that may be used include but are not limited to the following:
- BkW=Brake (shaft) kilowatt of Fan in (kilowatts, kW);
- D=Wheel Diameter, in (m);
- d=Relative Density, (dimensionless);
- $e_s$=Static Efficiency, in (fractions);
- $e_t$=Mechanical (Total) Efficiency in (fractions);
- $F_1$=Temperature Correction Factor, in (kg/m3);
- $F_2$=Altitude Correction Factor, in (kg/m3);
- FkW=Fan Power, in (kilowatts);
- GkW=Gas (Air) kilowatt of Fan, in (kilowatts, kW);
- K=Ratio of Specific Heats, Cp/Cv, (dimensionless);
- $P_1$=Fan Inlet Pressure, in [mm $H_2O$ (abs.)], or (in [Pa (abs.)];
- $P_s$=Static Pressure of Fan, in [mm $H_2O$ (abs.)], or in [Pa(abs.)];
- $P_{s2}$=Fan Outlet Static Pressure, in [mm $H_2O$ (abs.)], or in [Pa(abs.)];
- $P_t$=Total Pressure in (mm $H_2O$), or in (Pa);
- $P_{tf}$=Fan Total Pressure in (mm $H_2O$), or (Pa);
- $P_v$=Velocity Pressure of Fan, in (mm $H_2O$), or (Pa);
- pv2=Fan Outlet Velocity Pressure, in [mm $H_2O$ (abs.)], or [Pa(abs.)];
- r/min=Rotational Speed, in (rotations per minute);
- $T_1$=Gas Temperature at Fan Inlet, in (K);
- $V_1$=Fan inlet Rate, in (m3/h);
- $V_m$=Gas Velocity, in (m/s);
- $V_p$=Peripheral Velocity, in (m/s);
- t=Temperature Rise, in (K or degree ° C.); and
- ρ (rho)=Density (Mass Density), in (kg/m3).

Units of measure are provided for reference. Different units of measure may be used in implementation of the subject technology. Other process variables and/or some combination thereof may be used.

Constellation of Fan Operation Information

Fan operation information can be processed as a constellation of data. This constellation if analyzed may reveal the potential for damaging resonance and other issues. The constellation may include but is not limited to information regarding one or more of fan speeds, supplied power, phase of supplied power, and/or other information about operation of the fans. The constellation of information about the fans preferably is monitored, analyzed, and/or controlled by controller(s) 300 to achieve some or all of the goals set forth herein. Controller(s) 300 may use sensor(s) 105, internal controls, and/or other sources to acquire the relevant information.

Phase Analysis

Inputs at a harmonic frequency may not create resonance if they are out of phase. Frequencies must be "phase matched" to create resonance. For example, two signals at a same frequency with a matched phase will amplify each other, while two signals at a same frequency but with opposite phases will cancel each other out. Controller(s) 300 therefore may use phase analysis when controlling fan operation. For example, the controller(s) may receive input from sensor(s) 105 to determine if phase matching has occurred and then may adjust fan speeds and/or phase of power and/or information supplied to the fans to "break" the phase matching. For another example, controller(s) 300 may ensure power and/or information sent to fans 101 has phases that do not reinforce each other without input from sensor(s) 105.

Fourier transforms may be used by controller(s) 300 to analyze potential phase matching. Other mathematical techniques may be used. A phase shift oscillator may be used to change the phase of power and/or information sent to one or more of the fans to avoid phase matching.

Common Divisor Calculations

Processor(s) 300 may use common divisor calculations, for example the Euclidean algorithm and/or Stein's algorithm, to verify the speeds of fans 101 do not have a common harmonic frequency.

Figure 4:
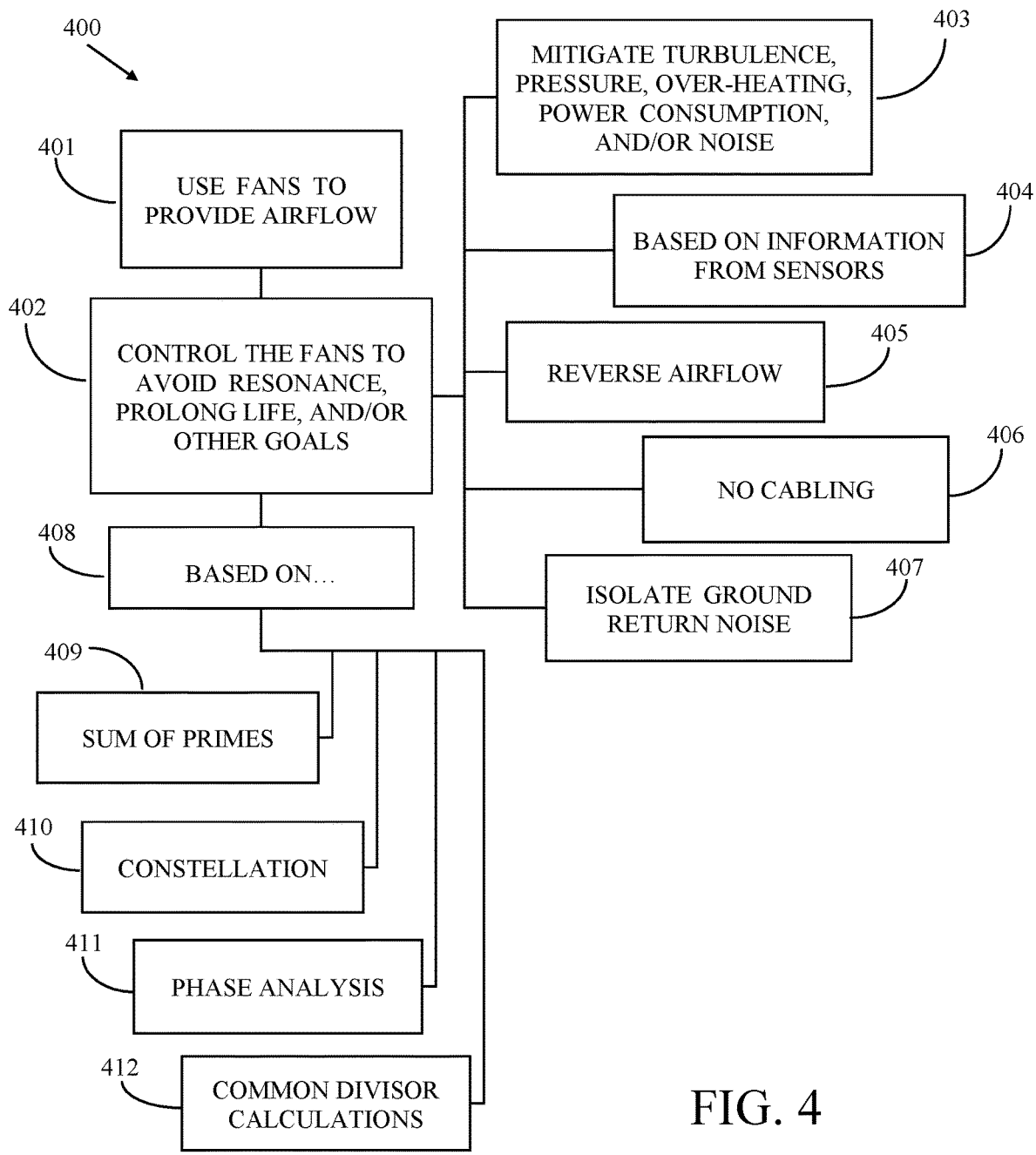
FIG. 4 is a flowchart showing steps of controlling fans according to aspects of the subject technology.

FIG. 4 is a flowchart showing steps of controlling fans according to aspects of the subject technology. Method 400 includes step 401 of using fans to provide airflow to a computing device or portions therefor and step 402 of controlling the fans to avoid resonance, prolong fan life, and/or other goals as discussed above.

Step 402 preferably also mitigates turbulence, pressure, over-heating, power consumption, and or noise of the fans as illustrated by element 403. Step 402 may operate based on information from sensor(s) as illustrated by element 404. The control may include reversing airflow as illustrated by element 405. In some aspects, the control is performed without use of cabling as illustrated by element 406. Ground noise may be isolated as illustrated by element 407.

Element 408 represents non-limiting bases for control 402. These bases include but are not limited to sum of primes calculations 409, constellation of information 410, phase analysis 411, and common divisor calculations 412.

The subject technology may be performed by one or more computing device(s) such as controller(s) 104 in FIGS. 1 and 2 and controller(s) 300 in FIG. 3. The computing device(s) preferably includes at least a tangible computing element. Examples of a tangible computing element include but are not limited to a microprocessor, application specific integrated circuit, programmable gate array, memristor based device, and the like. A tangible computing element may operate in one or more of a digital, analog, electric, photonic, quantum mechanical, and/or some other manner. Control may be performed by a virtualized computing device that ultimately runs on tangible computing elements or any other form of computing device.

Additionally, some operations may be considered to be performed by multiple computing devices. For example, steps of controlling may be considered to be performed by both a local computing device and a remote computing device that instructs the local computing device to control something. Communication between computing devices may be through one or more other computing devices and/or networks.

The invention is in no way limited to the specifics of any particular aspects (e.g., embodiments, elements, steps, and/or examples) disclosed herein. For example, the terms "aspect," "example," "preferably," "alternatively," "may," and the like denote features that may be preferable but not essential to include in some embodiments of the invention. Details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A fan device used with respect to a computing device, comprising:
   at least two fans that provide airflow for the computing device; and
   a controller including a processor configured to:
      adjust the fans' speeds in an attempt to avoid harmonic vibrations of the at least two fans; and
      use sums of primes to control the fans' speeds in the effort to avoid the harmonic vibrations.

2. The fan device as in claim 1,
   further comprising at least one sensor;
   wherein the controller is configured to adjust the fans' speeds based at least on information from the at least one sensor in the attempt to avoid the harmonic vibrations.

3. The fan device as in claim 1, wherein the attempt to avoid the harmonic vibrations is also an attempt to mitigate one or more of turbulence, pressure, over-heating, power consumption, or noise in, by, or around the computing device.

4. The fan device as in claim 1, wherein the controller is configured to reverse airflow of at least one of the fans in an attempt to mitigate one or more of turbulence, pressure, over-heating, power consumption, or noise in, by, or around the computing device.

5. The fan device as in claim 1,
   further comprising a fan bar that holds at least one of the fans;
   wherein the fan bar enables isolation of ground return noise by using local decoupling of the fans' power usage.

6. The fan device as in claim 1, wherein the controller and the fans are configured to communicate without use of cabling.

7. The fan device used with respect to the computing device as in claim 1, wherein the sums of primes are related to one or more process variables for the fans.

8. The fan device as in claim 1, wherein the processor is configured to use a constellation of the fans' speeds in the effort to avoid the harmonic vibrations.

9. The fan device as in claim 1, wherein the processor is configured to use phase analysis to control the fans in the effort to avoid the harmonic vibrations.

10. A fan device used with respect to a computing device, comprising:
    at least two fans that provide airflow for the computing device; and
    a controller including a processor configured to:
       adjust the fans' speeds in an attempt to avoid harmonic vibrations of the at least two fans; and
       use common divisor calculations to control the fans' speeds in the effort to avoid the harmonic vibrations.

11. A fan device used with respect to a computing device, comprising:
    at least two fans that provide airflow for the computing device; and
    a controller including a processor configured to adjust the fans' speeds in an attempt to avoid harmonic vibrations of the at least two fans, wherein the attempt to avoid the harmonic vibrations is also an attempt to mitigate one or more of turbulence, pressure, over-heating, or power consumption in, by, or around the computing device.

12. A fan device used with respect to a computing device, comprising:
    at least two fans that provide airflow for the computing device; and
    a controller including a processor configured to adjust the fans' speeds in an attempt to avoid harmonic vibrations of the at least two fans, wherein the controller is configured to reverse airflow of at least one of the fans in an attempt to mitigate one or more of turbulence, power consumption, or noise in, by, or around the computing device.

13. A fan device used with respect to a computing device, comprising:
    at least two fans that provide airflow for the computing device;
    a controller including a processor configured to adjust the fans' speeds in an attempt to avoid harmonic vibrations of the at least two fans; and
    a fan bar that holds at least one of the fans, wherein the fan bar is configured to enable isolation of ground return noise by using local decoupling of the fans' power usage.

14. A fan device used with respect to a computing device, comprising:
    at least two fans that provide airflow for the computing device; and
    a controller including a processor configured to adjust the fans' speeds in an attempt to avoid harmonic vibrations of the at least two fans;
    wherein:
       the controller is local to the fans;
       the controller is configured to provide power to the fans; and
       the controller and the fans are configured to communicate with each other without use of cabling.

* * * * *